(12) United States Patent
Hannemann et al.

(10) Patent No.: US 8,813,507 B2
(45) Date of Patent: Aug. 26, 2014

(54) METHOD FOR PRODUCING MOTOR ENERGY FROM FOSSIL FUELS WHILE DISSIPATING PURE CARBON DIOXIDE

(75) Inventors: Frank Hannemann, Freiberg (DE); Martin Pfund, Dessau (DE); Manfred Schingnitz, Freiberg (DE)

(73) Assignees: Siemens Aktiengesellschaft, Munich (DE); Siemens Fuel Gasification Technology GmbH & Co. KG, Munich (DE)

( * ) Notice: Subject to any disclaimer, the term of this patent is extended or adjusted under 35 U.S.C. 154(b) by 1138 days.

(21) Appl. No.: 12/599,583

(22) PCT Filed: Apr. 28, 2008

(86) PCT No.: PCT/EP2008/055136
§ 371 (c)(1),
(2), (4) Date: Nov. 10, 2009

(87) PCT Pub. No.: WO2008/138735
PCT Pub. Date: Nov. 20, 2008

(65) Prior Publication Data
US 2010/0300112 A1   Dec. 2, 2010

(30) Foreign Application Priority Data
May 11, 2007   (DE) .......................... 10 2007 022 168

(51) Int. Cl.
*F02C 6/18*   (2006.01)
*F02G 3/00*   (2006.01)
*F02C 1/00*   (2006.01)
*F02G 1/00*   (2006.01)

(52) U.S. Cl.
USPC ............. 60/781; 60/783; 60/39.53; 60/39.55; 60/39.52; 60/39.464

(58) Field of Classification Search
USPC ................ 60/781, 783, 39.12, 39.182, 39.52, 60/39.53, 39.55, 39.464
See application file for complete search history.

(56) References Cited

U.S. PATENT DOCUMENTS 4,444,742 A   4/1984   Hass et al.
4,498,289 A   2/1985   Osgerby
(Continued)

FOREIGN PATENT DOCUMENTS

DE   3501456 A1   7/1986
DE   3926964 A1   2/1991
(Continued)

OTHER PUBLICATIONS

Strakey, The Gas Turbine Handbook, 2006, Ed/Vol, US Dept of Energy, p. 207 http://www.netl.doe.gov/technologies/coalpower/turbines/refshelf/handbook/TableofContents.html.*

(Continued)

*Primary Examiner* — Phutthiwat Wongwian
*Assistant Examiner* — William Breazeal

(57) ABSTRACT

A method for producing electric energy from solid and liquid fuels is provided. The fuels are first subjected to a gasification process at high pressure, and the scrubbed gasification gas is fed to a gas and steam turbine process. The combustion of the scrubbed gasification gas in the gas turbine chamber does not occur with air, but with a mixture made of the three components oxygen, carbon dioxide and water vapor. As a result, the waste gas of the gas turbine is made only of carbon dioxide and water vapor. After the condensation thereof, technically pure carbon dioxide remains, which can be dissipated by storage in the deep substrate of the atmosphere.

18 Claims, 5 Drawing Sheets

(56) References Cited

U.S. PATENT DOCUMENTS

| | | | |
|---|---|---|---|
| 5,660,807 A * | 8/1997 | Forg et al. | 423/236 |
| 5,929,126 A * | 7/1999 | Koveal et al. | 518/709 |
| 6,877,322 B2 * | 4/2005 | Fan | 60/781 |
| 2002/0121093 A1 * | 9/2002 | Wallace et al. | 60/780 |
| 2003/0131582 A1 | 7/2003 | Anderson et al. | |
| 2004/0011057 A1 * | 1/2004 | Huber | 60/781 |

FOREIGN PATENT DOCUMENTS

| | | |
|---|---|---|
| DE | 19601713 A1 | 7/1997 |
| DE | 19728151 C2 | 6/2000 |
| DE | 102004042418 B4 | 4/2008 |
| EP | 0259114 A1 | 3/1988 |
| WO | 0190548 A1 | 11/2001 |
| WO | 03080503 A1 | 10/2003 |
| WO | 2004272220 A1 | 4/2004 |

OTHER PUBLICATIONS

Lieuwen, Fuel Flexibility Influences on Premixed Combustor Blowout, Flashback, Autoignition, and Stability, Jun. 2006, ASME, p. 3 http://soliton.ae.gatech.edu/people/tlieuwen/publications/Conferences/2006/tim2006turboExpo.pdf.*

Steynberg, Fischer-Tropsch Technology, 2004, Elsevier, pp. 367-368.*

Mazotti, Carbon Capture and Storage, 2005, Cambridge University Press, p. 33 http://www.ipcc.ch/publications__and__data/__reports__carbon__dioxide.htm.*

Biarnes, "Combustion", 2013 E Instruments International LLC, p. 3.*

Drenckhahn et al., "Wege zum Co2-emissionsfreien fossilbefeuerten Kraftwerk", Energiewirtschaftliche Tagesfragen Jan. 2, 2004, pp. 86-89.

Higginbotham et al., 6 th. European Gasification Conference Abstract No. 044, Process Integration in Gasification Systems for Multiproduct Application, pp. 1-9.

Delaney, "Hatfield—The First United Kingdom IGCC Plant", Jacobs Consultancy, Aug. 2003, pp. 1-13.

* cited by examiner

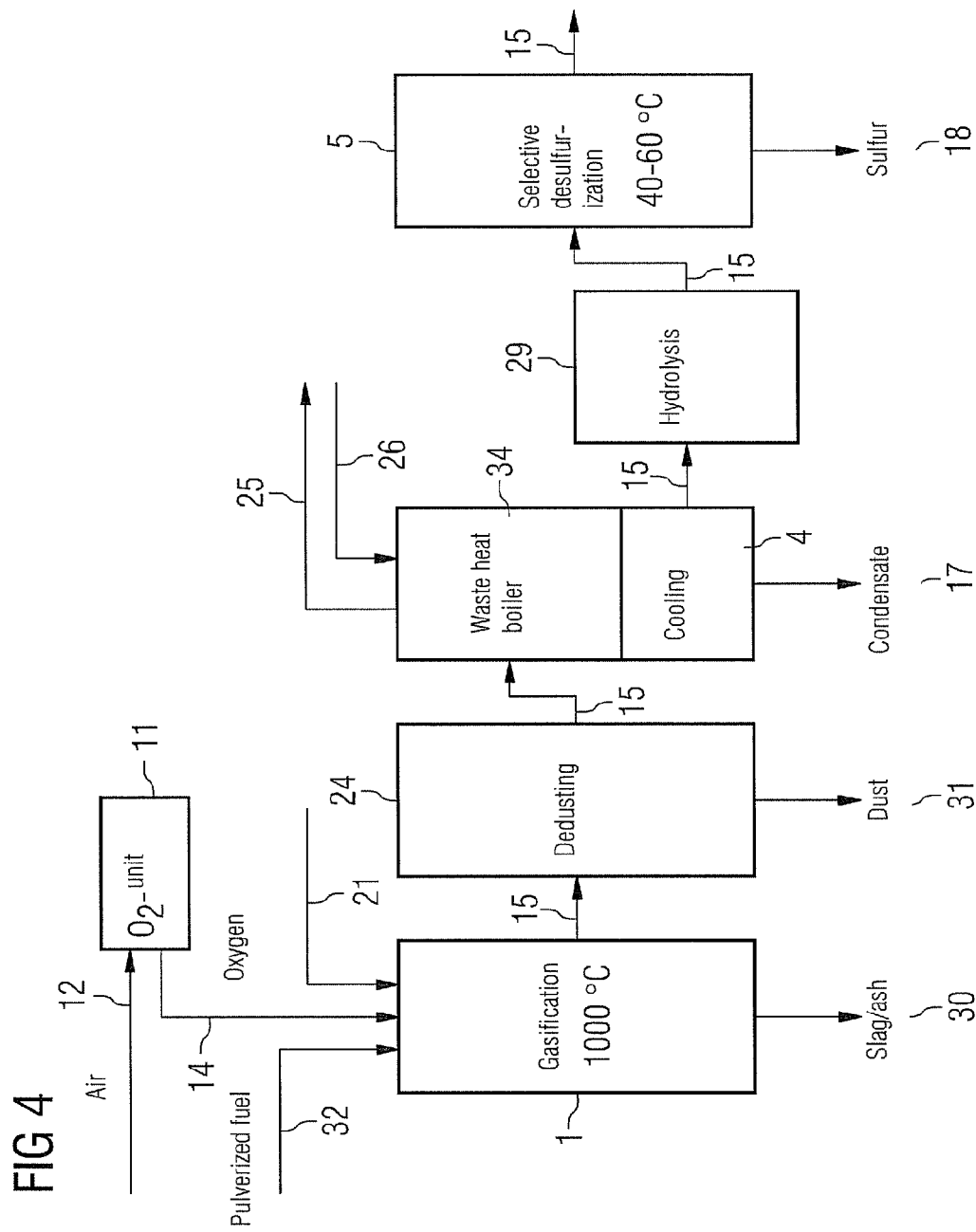

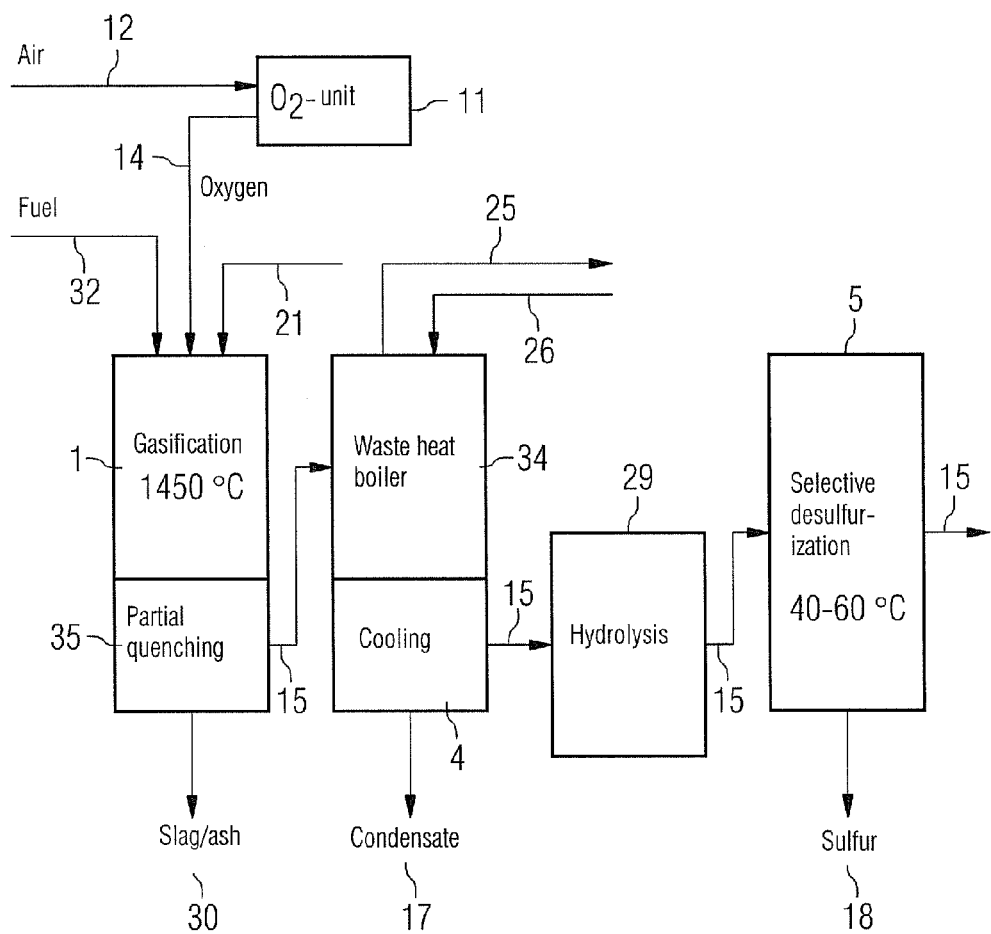

METHOD FOR PRODUCING MOTOR ENERGY FROM FOSSIL FUELS WHILE DISSIPATING PURE CARBON DIOXIDE

CROSS REFERENCE TO RELATED APPLICATIONS

This application is the US National Stage of International Application No. PCT/EP2008/055136, filed Apr. 28, 2008 and claims the benefit thereof. The International Application claims the benefits of German application No. 10 2007 022 168.3 DE filed May 11, 2007, both of the applications are incorporated by reference herein in their entirety.

FIELD OF INVENTION

The invention relates to a method and an arrangement for producing motor energy from solid or liquid fuels with removal of pure carbon dioxide.

The invention relates to a method and an arrangement for producing motor energy, particularly also generated electrical power, from solid and liquid fuels, i.e. energy carriers. Solid and liquid energy carriers are to be understood as meaning coals of different ranks and cokes of different origin, biomass mechanically and thermally conditioned for power generation, and residual and waste materials, but also water-coal or oil-coal/coke suspensions otherwise known as slurries.

BACKGROUND OF INVENTION

In the last decade, IGCC (Integrated Gasification Combined Cycle) technology has come into use for electrical power generation. It is characterized in that the fuel is not combusted directly, but first undergoes a gasification process using oxygen or air to produce a combustion gas rich in hydrogen and carbon monoxide. Said combustion gas can then be used in a combined cycle gas and steam turbine process. A number of such plants have been built worldwide, with in particular hard coals and petroleum cokes being used a fuels. The relevant background art is extensively described in the international technical literature.

Reference shall be made here to the following publications:
Trevino, M: Integrated Gasification Combined Cycle Technology; IGCC, ELCOGAS, Club Español de la Energia, March 2003
Gomez, F. S. et al.: Puertollano IGCC Plant: Operating Experiences and Further Technology Development for Commercial Generation of Clean Energy from Coal Russia Power Conference 2004, 10-11, Mar. 2004, Moscow
Delaney, R.: Hatfield—The first United Kingdom IGCC Plant IChemE Conference "Gasification—A versatile solution" 10-12 May 2004 Brighton, UK The advantage of IGCC technology is that, by combining a gas turbine, with its high inlet temperatures, with a downstream steam turbine which uses the gas turbine's waste heat steam, increased efficiencies can be achieved. In addition, there are developments to modify IGCC technology such that a concentrated $CO_2$ stream is obtained which creates the necessary conditions for separating off the $CO_2$ and removing it from the atmosphere e.g. by means of underground storage. The first demonstration power plants are in preparation. Descriptions of the technology can be found in:
Denkhahn, W. et al.: Wege zum $CO_2$—emissionsfreien fossilbefeuerten Kraftwerk (Towards a $CO_2$ emissions-free fossil-fired power plant) Energiewirtschaftliche Tagesfragen ½. 2004, pages 86-89
Higginbotham, P "Process Integration in Gasification et al.: System for Multiproduct Applications" in $6^{th}$ European Gasification Conference, 10-12 May 2004, Brighton, UK.

IGCC technology with $CO_2$ capture is characterized by the following process stages:
gasification of the fuel, e.g. in an entrained bed gasifier at temperatures of between 1250 and 1700° C.
cooling of the gasification gas and saturation with water vapor at 190-220° C.
raw gas conversion by carrying out the reaction $$CO+H_2O \rightleftharpoons CO_2+H_2$$

removal of carbon dioxide and sulfur compounds from the converted raw gas using prior art methods
conversion of the resulting technical hydrogen into electricity in a combined cycle (gas and steam turbine) process
compressing the abstracted carbon dioxide and taking it away for storage underground Said prior art is characterized by the following disadvantages:
The efficiency of IGCC technology with $CO_2$ capture is up to 10% less than that without $CO_2$ capture. In addition to the energy required for $CO_2$ compression, which is an inherent feature of all the technology models, this disadvantage results from the stages of CO conversion and $CO_2$ separation from the converted raw gas.
CO conversion is strongly exothermic, which means that some of the chemical energy contained in the raw gas is converted into heat and can only be used for steam generation.
$CO_2$ capture cannot be performed selectively but only collectively with the sulfur compounds. These components therefore have to be separated out in a secondary stage. The energy required for regenerating the solvent used for absorption is very high, resulting in considerable steam consumption.

SUMMARY OF INVENTION

The object of the invention is to specify an improved technology for producing motor energy from fossil fuels with removal of technical grade carbon dioxide.

The object is achieved by a method having the features set forth in the claims and an arrangement having the features set forth in the claims.

According to the invention, the IGCC technology selected comprises the following stages:
gasification of the fuel e.g. in an entrained bed gasifier or a fluidized bed gasifier
cooling of the combustion gas to temperatures <200° C. with utilization of the heat content
performing catalytic raw gas hydrolysis at temperatures <200° C. to eliminate HCN and COS according to the reactions $$HCN+H_2O \rightleftharpoons NH_3+CO$$

$$COS+H_2O \rightleftharpoons H_2S+CO_2$$

carrying out selective scrubbing to remove the $H_2S$ according to prior art methods, e.g. by means of an oxidation method to convert the $H_2S$ into elemental sulfur or by means of a selective $H_2S$ absorption method in conjunction with a Claus unit
feeding the desulfurized gasification gas to the combustion chamber of a gas turbine and combusting it with a mixture of oxygen, $CO_2$ and water vapor with a composition of preferably
$O_2$=21 vol %
$CO_2$=29 vol %

$H_2O$=50 vol %
as synthetic combustion air recovering heat from the gas turbine's exhaust gas by extracting high-pressure steam and using the resulting steam in a steam turbine cooling the gas turbine's exhaust gas consisting of carbon dioxide and water vapor and condensing out the water vapor compressing the remaining carbon dioxide and feeding back part of the $CO_2$ to produce the synthetic combustion air delivering the rest of the $CO_2$ for storage or material use or venting it to the atmosphere Some of the electrical power generated in the gas and steam turbine is used for internal consumption, the rest is delivered as net energy.

The fuel can be supplied pneumatically to the gasification reactor, either dry as a conveying gas—pulverized fuel suspension or also wet as a water or oil—pulverized fuel suspension.

With the invention, the disadvantageous stages of CO conversion and $CO_2$ absorption are superfluous, resulting in a corresponding reduction in equipment and operating costs. The exhaust gas only consists of carbon dioxide and water vapor, thereby enabling technical grade carbon dioxide to be separated out and removed in a simple manner, which basically constitutes a $CO_2$-free power plant.

Advantageous further developments of the subject matter of the application are detailed in the sub-claims.

BRIEF DESCRIPTION OF THE DRAWINGS

The invention will now be explained to the extent necessary for its understanding based on exemplary embodiments and with reference to the 5 accompanying drawings in which:

FIG. 4: shows an IGCC technology with a low temperature gasifier with deduster and waste heat boiler FIG. 5: shows an IGCC technology with partial quenching and downstream waste heat boiler each solution featuring the removal of technical grade carbon dioxide.

In the figures, the same designations are used to identify identical elements.

DETAILED DESCRIPTION OF INVENTION

Example 1

Figure 1:
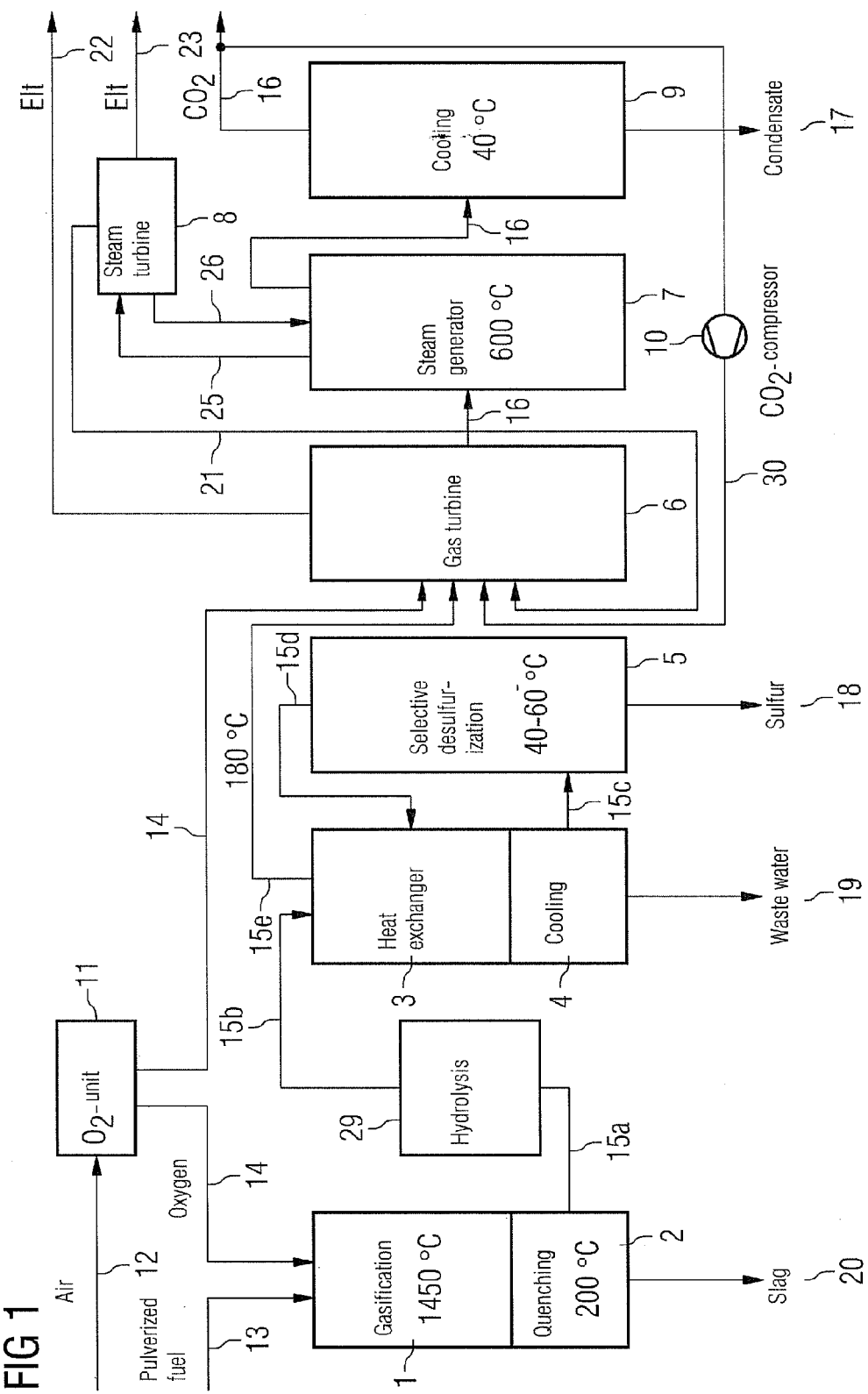
FIG. 1: shows an IGCC technology with reheating of the desulfurized gasification gas
Figure 2:
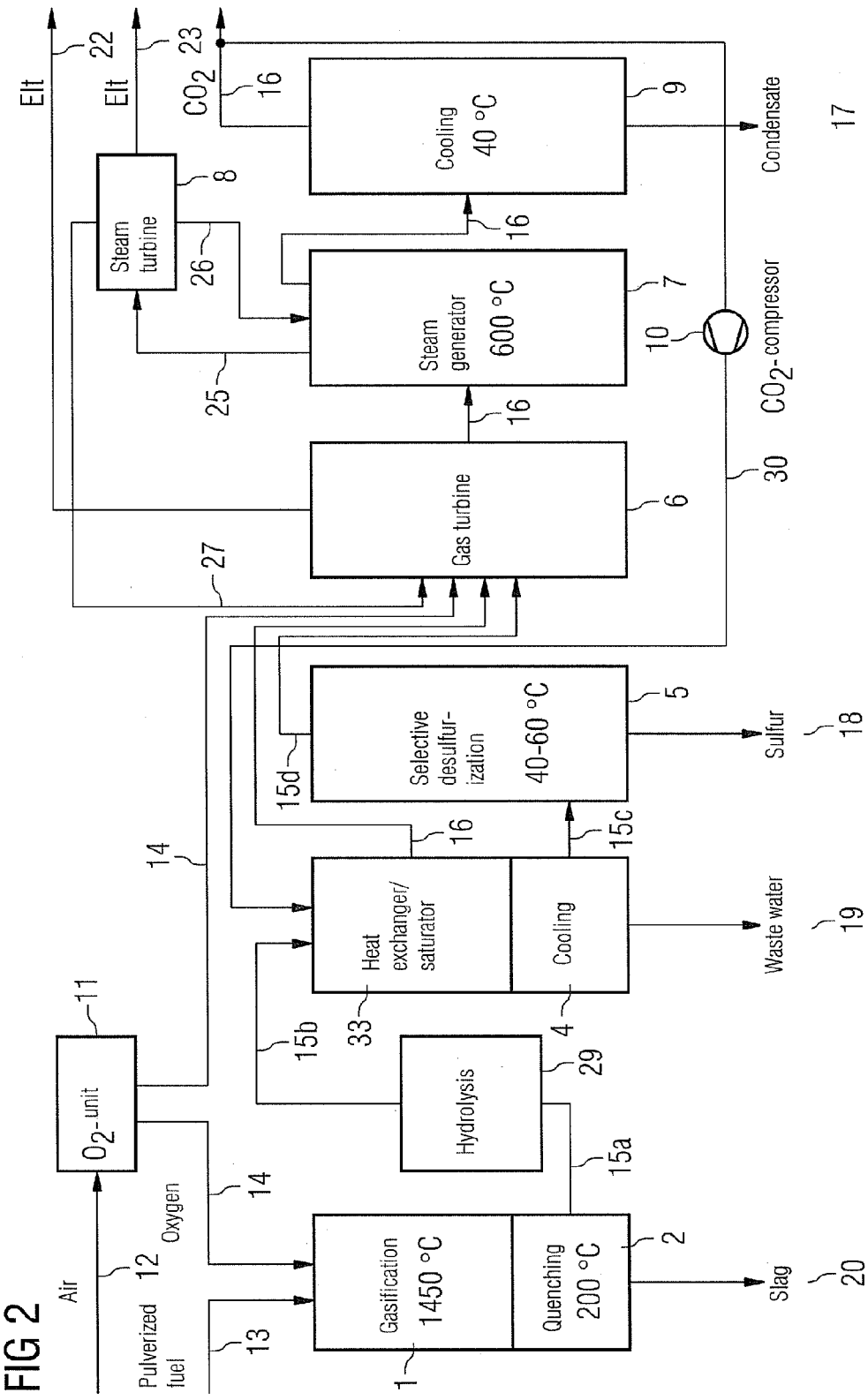
FIG. 2: shows an IGCC technology with heating and water vapor saturation of the $CO_2$ supplied to the gas turbine

The example will be described with reference to FIG. 1.

An IGCC plant is designed for a gross energy consumption of 1200 MW. For this purpose 170 Mg/h of hard coal with a calorific value of 25218 kJ/kg is ground to a fine powder and fed pneumatically according to the dense-phase conveying principle to the gasification reactor 1 as pulverized fuel 13 and reacted with oxygen 14 from the oxygen unit 11 at 40 bar. Fed-back carbon dioxide is used as the conveying gas for pneumatically conveying the pulverized fuel. The pulverized fuel 13 is reacted at an equilibrium temperature of 1,450° C. in an entrained bed gasifier 1 to produce raw synthesis gas. At this temperature, the ash content of the pulverized fuel 13 is liquefied to slag and flows together with the hot raw gas into the quencher 2 where cooling to 200° C. by injection of excess water takes place, the raw gas being saturated with water vapor. The liquid slag is likewise cooled and, in so doing, is granulated. It is discharged from the quencher 2 as solid slag 20 via lock hoppers. The raw gas possesses the following analysis (dry):

| | |
|---|---|
| $H_2$ | 22.16 vol % |
| CO | 72.79 vol % |
| $CO_2$ | 4.19 vol % |
| $CH_4$ | 0.01 vol % |
| $N_2$ | 0.56 vol % |
| $NH_3$ | 0.001 vol % |
| HCN | 0.001 vol % |
| $H_2S$ | 0.233 vol % |
| COS | 0.032 vol % |
| HCl | 0.020 vol % |

The dry raw gas amounts to 282,500 m³ (STP)/h at a calorific value of 11,650 kJ/m³ (STP). For gasification, 83.700 m³ (STP)/h of oxygen are required. After further water scrubbing, the water-vapor-saturated raw gas 15 is fed to a raw gas hydrolyzer 29 at approximately 200° C. in order to catalytically convert carbonyl sulfide and hydrogen cyanide into hydrogen sulfide and ammonia by means of the reactions:

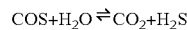

which are removed from the raw gas 15 in the downstream cleaning processes. After flowing through the heat exchanger 3 and the cooler 4 from which fine-dust-laden waste water 19 is withdrawn, the raw gas undergoes selective desulfurization 5 at temperatures of between 40 and 60° C. Prior art direct oxidation methods such as Sulferox and Locat can be used to oxidize the hydrogen sulfide directly to elemental sulfur. However, desulfurization can also be performed using selective absorption methods combined with a Claus unit. The cleaned gas is thus available for the gas turbine. To use low-temperature heat, the cleaned gas can first be heated against the uncleaned raw gas to e.g. 150 to 180° C. in the heat exchanger 3. To achieve a maximally pure $CO_2$ stream, the cleaned gas is not burned with air in the combustion chamber of the gas turbine 6, but with a mixture of oxygen, carbon dioxide and water vapor, the mixture of said components being designed to have similar properties to air during combustion of the cleaned gas 15, in order to avoid modifications to the gas turbine's combustion chamber.

This is achieved using a composition of:

| | |
|---|---|
| $CO_2$ | 21 vol % |
| $CO_2$ | 29 vol % |
| $H_2O$ | 50 vol % | as synthetic combustion air. However, certain other concentration ranges are also possible, said components possibly varying between

| | |
|---|---|
| $CO_2$ | 18-30 vol % |
| $CO_2$ | 10-50 vol % |
| $H_2O$ | 30-70 vol % |

Taking the first mentioned values as the basis, we obtain the following consumptions for combustion of the cleaned gas 15 based on said gas analysis and a gas flow rate of 282,500 m³ (STP)/h for ideal combustion for an oxygen-fuel ratio of 1:

$$O_2: 134,000 \text{ m}^3(STP)/h$$
$$CO_2: 185,000 \text{ m}^3(STP)/h$$
$$\underline{H_2O: 319,000 \text{ m}^3(STP)/h}$$
$$\Sigma\ 638,000 \text{ m}^3(STP)/h$$

Combustion of the cleaned gas 15 at an oxygen ratio of 1 results in an exhaust gas flow rate of 738,000 m³ (STP)/h. The combustion temperature is 2,032° C. However, the exit temperature from the gas turbine's combustion chamber should not exceed 1,250° C. To achieve this, the calorific value of the gas 15 must be reduced by introducing water vapor and carbon dioxide, 405,000 m³ (STP)/h water vapor and
233,000 m³ (STP)/h carbon dioxide
being added here.

A 1,250° C. exhaust gas therefore leaves the combustion chamber of the gas turbine 6 at flow rate of $$\text{water vapor } 786,000 \text{ m}^3(STP)/h \triangleq 55.7 \text{ vol \%}$$
$$\underline{\text{carbon dioxide } 624,000 \text{ m}^3(STP)/h \triangleq 44.2 \text{ vol \%}}$$
$$\Sigma\ 1,410,000 \text{ m}^3(STP)/h$$

The nitrogen content is <0.1 vol %.

The gas turbine exhaust gas 16 with the above analysis leaves the gas turbine 6 at approximately 600° C. and is used in the steam generator 7 whose waste heat steam 25 drives the steam turbine 8 which produces the electricity 23. This together with the electrical energy 22 from the gas turbine block constitutes the gross electrical output. The steam condensate 26 is returned to the steam generator 7. Back-pressure steam from the steam turbine 8 can be fed both to the gas 15 and to produce the synthetic combustion air. After leaving the steam generator 7, the combustion exhaust gas 16 is fed to the cooler 9, with most of the water vapor being condensed out.

After condensate removal 17, all the carbon introduced with the pulverized fuel 13 is available in technical form as carbon dioxide together with the portion 30 circulated via the $CO_2$ compressor 10. The portion resulting from the pulverized fuel can be removed from the process and stored or used for other purposes. At certain times during repairs or if $CO_2$ removal is not possible, the cleaned gas can be combusted with air in the gas turbine's combustion chamber.

Example 2

Example 2 is largely identical to Example 1. The difference is the use of the sensible heat of the raw gas 15. Whereas in Example 1 the desulfurized gas, after selective desulfurization 5, is heated against the approximately 200° C. undesulfurized raw gas in the heat exchanger 3, in Example 2 a heat exchanger/saturator 33 is provided in which the compressed carbon dioxide 30 fed to the gas turbine 6 via the compressor 10 is heated up and completely or partially saturated with water vapor by the introduction and evaporation of condensate. In this way, the water vapor to be supplied to the "synthetic air" is reduced by the amount produced in the heat exchanger/saturator 33.

Example 3

Figure 3:
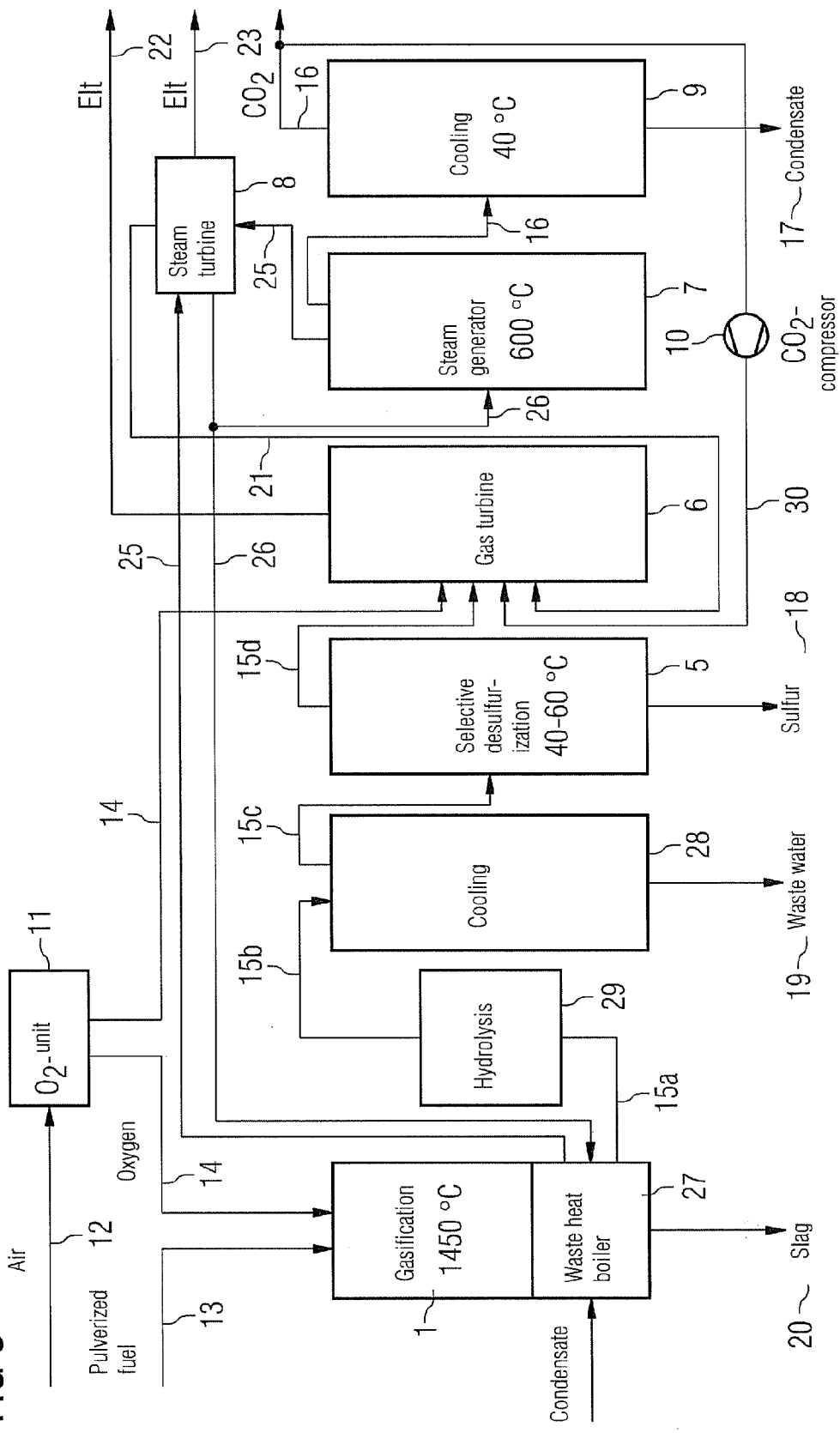
FIG. 3: shows an IGCC technology with a waste heat boiler downstream of the gasifier

In Example 3, as shown in FIG. 3, the pulverized fuel is not supplied in a pneumatically dry manner to the gasifier 1 but as a pulverized fuel-water suspension, a so-called slurry consisting of 50 wt % pulverized fuel (calculated as dry) and 50 wt % water. It is likewise reacted with oxygen in the gasifier 1 at temperatures of 1,450° C. and an operating pressure of 50 bar (5 MPa). The slurry can be pre-heated to temperatures of approx. 230° C. The raw gas exiting the gasification reactor 1 has the following composition:

| | |
|---|---|
| $H_2$ | 16.62 vol % |
| CO | 25.07 vol % |
| $CO_2$ | 16.53 vol % |
| $CH_4$ | 0 |
| $N_2$ | 0.42 vol % |
| $NH_3$ | 0.001 vol % |
| HCN | 0 |
| $H_2S$ | 0.26 vol % |
| COS | 0.016 vol % |
| $H_2O$ | 41.05 vol % |

For an input of 170 Mg/h pulverized fuel, corresponding to 340 Mg/h slurry, 491,000 m³ (STP)/h raw gas is produced wet. To use the sensible heat of this large amount of gas, a waste heat boiler 27 for generating medium-pressure steam is provided downstream of the gasifier 1. The slag 20 is flushed out of the waste heat boiler 27. The raw gas leaves the waste heat boiler 27 water-vapor-saturated at approx. 200° C. and is fed to the COS and HCN hydrolyzer 29. To eliminate entrained dust, the raw gas can undergo water scrubbing (not shown) downstream of the waste heat boiler 27. The hydrolysis stage 29 is followed by further waste heat use 28 before the raw gas is fed to the selective desulfurizer 5. The process continues as described in the above examples.

Example 4

In contrast to the high-temperature gasification in Examples 1 to 3, it is also possible to use low-temperature gasification such as a fluidized bed method, as shown in FIG. 4, in which the gasification temperatures are below 1000° C. For the same amount of coal of 170 Mg/h, a raw gas flow rate of 311,000 m³ (STP)/h with the following composition is achieved:

| | |
|---|---|
| $H_2$ | 23.46 vol % |
| CO | 66.47 vol % |
| $CO_2$ | 4.00 vol % |
| $CH_4$ | 2.45 |
| $N_2$ | 0.51 vol % |
| $NH_3$ | 0.004 vol % |
| HCN | 0.003 |
| $H_2S$ | 0.226 vol % |
| COS | 0.027 vol % |
| $H_2O$ | 2.83 vol % |

The ash 30, which is partially agglomerated to slag, is discharged from the gasifier. After dry, mechanical dedusting 24 with dust discharge 31, the raw gas passes through a waste heat boiler 34 and cooler 4 before being fed to the hydrolysis stage 29 and then to the selective desulfurizer 5. The technology is then the same as in the above examples. To limit the gasification temperature, carbon dioxide or water vapor, particularly back-pressure steam 21, is admixed with the oxygen 14.

Example 5

FIG. 5 shows by way of example a technological variant in which the gasifier 1 is initially followed by partial quenching

35. The raw gas leaving the gasification reactor 1 at a temperature of 1,450° C. is cooled down to temperatures of between 800 and 900° C. in the partial quencher 35 by injecting a limited amount of water, the raw gas not being saturated with water vapor. An advantage of this exemplary solution is that, at said temperatures, the liquid slag leaving the gasification reactor 1 together with the 1,450° C. raw gas is cooled down and solidified to the extent that it no longer adheres to the cooling surfaces of the downstream waste heat boiler 34. In the bottom of the partial quencher 35 is a water bath which receives the now solid slag 30. It is flushed out at regular intervals. After the waste heat boiler 34, the raw gas 15 is fed to the known hydrolyzer 29 either directly or after further cooling 4 to approx. 200° C. and then to the selective desulfurizer 5. The technology is otherwise the same as in the foregoing examples.

The invention comprises a method for generating electrical energy from solid and liquid energy carriers such as coals of different ranks and cokes of different origins, for gasifying mechanically and thermally conditioned biomasses, residual and waste materials, but also water- or oil-coal/coke suspensions by combining the gasification of said energy carriers at temperatures of between 800 and 1700° C. and pressures of up to 80 bar using nitrogen-free gasification media such as oxygen to which carbon dioxide and/or water vapor is added to produce a combustion gas with combined cycle technology, wherein the combustion gas is burnt in the combustion chambers of a gas turbine, combustion of the combustion gas being carried out using a mixture of oxygen, carbon dioxide and/or water vapor.

In particular embodiment of the invention, the mixture of oxygen, carbon dioxide and water vapor used for combustion of the combustion gas in the gas turbine's combustion chamber has the following composition

| | |
|---|---|
| $O_2$ | 18-30 vol % |
| $CO_2$ | 10-50 vol % |
| $H_2O$ | 30-70 vol %, | preferably

| | |
|---|---|
| $O_2$ | 21 vol % |
| CO2 | 29 vol % |
| $H_2O$ | 50 vol %. |

In further embodiment of the invention, gasification is followed by quenching of the hot gasification gas to temperatures of between 160 and 220° C. by injection of water.

In further embodiment of the invention, quenching of the gasification gas to temperatures of between 160 and 220° C. is followed by COS and HCN hydrolysis, the gasification gas possibly undergoing dry or wet dedusting between quenching and hydrolysis.

In further embodiment of the invention, COS and HCN hydrolysis is followed by selective desulfurization.

In further embodiment of the invention, selective desulfurization is performed by a physically or chemically acting absorbing agent which has a high solubility for hydrogen sulfide and low solubility for carbon dioxide.

In further embodiment of the invention, desulfurization is performed in a first stage in a solvent constituting a reduction-oxidation system in which components of the solvent are reduced and the sulfur ions $S_2$— of the dissolved hydrogen sulfide are oxidized to elemental sulfur S and the reduced components of the solvent are oxidized again in a further stage by oxygen or air.

In further embodiment of the invention, the hydrogen sulfide absorbed by the selective solvent is stripped out and then converted into elemental sulfur by partial combustion.

In further embodiment of the invention, the hydrogen sulfide is separated from the gasification gas by an adsorption process.

In further embodiment of the invention, the desulfurized gasification gas as cleaned gas is heated to 180° C. by the raw gas in a heat exchanger.

In further embodiment of the invention, the desulfurized raw gas is saturated with water vapor by evaporation of water during said heating.

In further embodiment of the invention, the cleaned gas is fed to the combustion chamber of a gas turbine.

In further embodiment of the invention, the cleaned gas is combusted in the gas turbine's combustion chamber with a mixture of oxygen, carbon dioxide and water vapor.

In further embodiment of the invention, the combustion exhaust gas of the gas turbine is fed to a steam generator.

In further embodiment of the invention, after the steam generator the combustion exhaust gas is cooled and the water vapor content is condensed and separated.

In further embodiment of the invention, the technical grade carbon dioxide remaining after water separation is divided up.

In further embodiment of the invention, part of the carbon dioxide is compressed and fed to the gas turbine's combustion chamber and the other part is removed from the process for recycling or taking to final storage.

In further embodiment of the invention, the part of the carbon dioxide to be fed to the gas turbine is heated against the raw gas in a heat exchanger to temperatures of up to 180° C.

In further embodiment of the invention, the heated carbon dioxide is simultaneously saturated with water vapor.

In further embodiment of the invention, the gasifier is followed by a waste heat boiler for producing high-pressure steam.

In further embodiment of the invention, the raw gas is fed to a COS and HCN hydrolyzer downstream of the waste heat boiler.

In further embodiment of the invention, gasification is followed by dry dedusting of the hot gasification gas and a waste heat boiler for high-pressure steam generation.

In further embodiment of the invention, gasification is followed by partial quenching of the raw gas to temperatures of between 700 and 1000° C. before the partially quenched raw gas is fed to a waste heat boiler.

In further embodiment of the invention, if $CO_2$ capture is not provided, the cleaned gas is combusted with air in the gas turbine's combustion chamber.

The invention claimed is:

1. A method for producing motor energy from solid or liquid energy carriers with a removal of pure carbon dioxide, comprising:
   carrying out a gasification of the energy carrier using a nitrogen-free gasification medium; and
   generating steam for a steam turbine with the waste heat from gasification,
   producing a desulfurized raw gas by:
   carrying out a catalytic raw hydrolysis at temperatures below 300° C. to hydrolyze HCN to $NH_3$ and CO and to hydrolyze COS to $H_2S$ and $CO_2$; and carrying out a selective scrubbing of the raw gas to remove the $H_2S$;

combusting the desulfurized raw gas in a gas turbine with a synthetic combustion air comprising oxygen, carbon dioxide, and water to produce a gas turbine exhaust gas consisting essentially of carbon dioxide and water; and condensing the water vapor out of the gas turbine exhaust gas to produce a stream consisting of carbon dioxide, wherein the synthetic combustion air used during combusting consist of in a weight percentage, $O_2$ 18-30%, $CO_2$ 10-50%, and $H_2O$ 30-70%.

2. The method as claimed in claim 1, wherein the synthetic combustion air used during the combusting consists of in the weight percentage, $O_2$ 21%, $CO_2$ 29% and $H_2O$ 50%.

3. The method as claimed in claim 1, wherein a calorific value of the desulfurized raw gas is reduced by introducing water vapor and the fed-back carbon dioxide.

4. The method as claimed in claim 1, wherein a particulate energy carrier is used as feedstock, and wherein the fed-back carbon dioxide is used for pneumatic conveying of the particulate energy carrier.

5. The method as claimed in claim 4, wherein the particulate energy carrier is pulverized coal.

6. The method as claimed in claim 1, wherein a pre-heated slurry is used as an energy carrier, and wherein the pre-heated slurry is gasified at a plurality of temperatures between 1250 to 1700° C. and an operating pressure of up to 8 MPa.

7. The method as claimed in claim 1, wherein the thermal energy contained in the gas turbine exhaust gas is used by a steam generator and a steam turbine.

8. The method as claimed in claim 1, wherein a back-pressure steam from the steam turbine is used to produce the synthetic combustion air.

9. The method as claimed in claim 1, recycling a portion of the stream consisting of carbon dioxide stream to produce the synthetic combustion air.

10. The method as claimed in claim 1, wherein the technical grade carbon dioxide is fed to recycling elsewhere.

11. The method as claimed in claim 10, wherein the technical grade carbon dioxide is fed to recycling in a separate chemical process or for refrigeration industry purposes.

12. The method as claimed in claim 1, wherein the gasification is followed by quenching of the hot raw gas to a plurality of temperatures of between 160 and 220° C. by injection of water.

13. An arrangement for producing motor energy from solid or liquid energy carriers with removal of pure carbon dioxide, comprising:

a gasifier for gasifying the energy carrier using a nitrogen-free gasification medium;

the gasifier having a waste heat boiler in fluid communion with a steam turbine, a catalytic raw gas hydrolyzer for converting HCN to $NH_3$ and CO and to convert COS to $H_2S$ and CO at temperatures of below 200° C.; and a device for selective scrubbing of the raw gas that removes the $H_2S$ to produce a desulfurized raw gas, a gas turbine for combusting the desulfurized raw gas along with a synthetic combustion air comprising $O_2$, $CO_2$ and $H_2O$ fed to the gas turbine and producing a gas turbine exhaust gas consisting essentially of carbon dioxide and water vapor, and a device for condensing out the water vapor to produce a stream consisting of carbon dioxide, wherein a portion of the carbon dioxide of the gas turbine exhaust gas is fed back via a compressor to produce the synthetic combustion air, wherein the synthetic combustion air used during combusting consist of in a weight percentage, $O_2$ 18-30%, $CO_2$ 10-50%, and $H_2O$ 30-70%.

14. The arrangement as claimed in claim 13, wherein the synthetic combustion air used during the combusting consists of in the weight percentage, $O_2$ 21%, $CO_2$ 29% and $H_2O$ 50%.

15. The arrangement as claimed in claim 13, wherein a calorific value of the desulfurized raw gas is reduced by introducing water vapor and the fed-back carbon dioxide.

16. The arrangement as claimed in claim 13, wherein a particulate energy carrier is used as feedstock, and wherein the fed-back carbon dioxide is used for pneumatic conveying of the particulate energy carrier.

17. The arrangement as claimed in claim 16, wherein the particulate energy carrier is pulverized coal.

18. The arrangement as claimed in claim 13, wherein a preheated slurry is used as an energy carrier, and wherein the pre-heated slurry is gasified at a plurality of temperatures between 1250 to 1700° C. and an operating pressure of up to 8 MPa.

* * * * *